(12) United States Patent
Loewen et al.

(10) Patent No.: US 10,203,043 B2
(45) Date of Patent: Feb. 12, 2019

(54) SYSTEMS AND METHODS FOR HIGH-RELIABILITY VALVE OPENING

(71) Applicant: GE-Hitachi Nuclear Energy Americas LLC, Wilmington, NC (US)

(72) Inventors: Eric P. Loewen, Wilmington, NC (US); Ana DaSilva, Schenectady, NY (US); Bradley L. Wile, Atlanta, GA (US); Nicholas F. O'Neill, Alpharetta, GA (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 191 days.

(21) Appl. No.: 14/942,986

(22) Filed: Nov. 16, 2015

(65) Prior Publication Data
US 2017/0138497 A1 May 18, 2017

(51) Int. Cl.
| | | |
|---|---|---|
| *F16K 17/40* | (2006.01) | |
| *F16K 17/36* | (2006.01) | |
| *G21C 9/008* | (2006.01) | |
| *G21C 9/02* | (2006.01) | |

(52) U.S. Cl.
CPC ............ *F16K 17/403* (2013.01); *F16K 17/36* (2013.01); *G21C 9/008* (2013.01); *G21C 9/024* (2013.01)

(58) Field of Classification Search
CPC ....... F16K 17/403; F16K 17/36; G21C 9/008; G21C 9/024
USPC .................................. 137/68.11, 70
See application file for complete search history.

(56) References Cited

U.S. PATENT DOCUMENTS

| | | |
|---|---|---|
| 2,458,123 A | 1/1949 | Wasserlein |
| 3,666,616 A | 5/1972 | Schluderberg |
| 3,670,925 A * | 6/1972 | Moyant ................ B60R 21/268 |
| | | 137/68.13 |

(Continued)

FOREIGN PATENT DOCUMENTS

| | | |
|---|---|---|
| DE | 1078247 B | 3/1960 |
| EP | 0086130 | 8/1983 |

OTHER PUBLICATIONS

International Search Report and Written Opinion issued in connection with corresponding PCT Application No. PCT/US2016/61777 dated Feb. 13, 2017.

(Continued)

*Primary Examiner* — P. Macade Nichols
(74) *Attorney, Agent, or Firm* — Ryan Alley IP

(57) ABSTRACT

Safety valves accurately control closure and opening of fluid passage through the valve. Valves include a barrier that blocks the fluid until removal only by a high-energy projectile. Following removal and opening, the barrier or the projectile can flow through the valve, which remains open. Bullets, pneumatic pistons, shot, coilgun pellets and any other forceful projectile may impact and remove the barrier. The projectile is actuated with any type of chemical reaction, firing pin, spring release, accelerating circuit, ignition circuit. Catchers in the valve envelop or otherwise retain the projectile or barrier pieces and enter the fluid flow of the opened valve without blocking it. Disruptable barriers include strong but breakable glass plates, thin steel sheets, a rotatable door and other barriers that can withstand potentially over 10,000 psi of fluid pressure while closing the valve. Valves can use circuits to both monitor valve open/closed status and initiate firing the projectile.

17 Claims, 7 Drawing Sheets

(56) References Cited

U.S. PATENT DOCUMENTS

| | | |
|---|---|---|
| 4,110,812 A | 5/1978 | Arutunian |
| 5,154,876 A | 10/1992 | Ehrke et al. |
| 5,413,308 A | 5/1995 | Hayes |
| 5,897,146 A | 4/1999 | Saito et al. |
| 6,161,878 A | 12/2000 | Atsumi et al. |
| 6,659,511 B2 | 12/2003 | Yoneyama |
| 7,708,064 B2 | 5/2010 | Sehsah |
| 7,971,838 B2 | 7/2011 | Osborn et al. |
| 2008/0289694 A1 | 11/2008 | Edwards |
| 2011/0241342 A1 | 10/2011 | Skellern et al. |
| 2014/0174555 A1 | 6/2014 | Wodara et al. |

OTHER PUBLICATIONS

"ESBWR Design Control Document, Tier 2," Revision 10 of Apr. 2014, Chapter 5.

* cited by examiner

SYSTEMS AND METHODS FOR HIGH-RELIABILITY VALVE OPENING

BACKGROUND

Several engineering systems, including nuclear power plants, use safety valves to ensure a flow path is opened in the case of malfunction, emergency, or needed operational relief. Such flow paths may ensure fail-safe status or operation of important safety systems and include valves that reliably open the flow paths in desired circumstances. FIG. 1 is a cross-sectional schematic of a related-art explosive safety valve 10 in a closed configuration. As shown in FIG. 1, in a closed configuration, flow at an inlet 11 of valve 10 is blocked by a shear cap 40 between inlet 11 and outlet 12. Shear cap 40 is attached to a casing of valve 10 at inlet 11 by shearing sections 45 that may readily or reliably break under known and desirable forces. Shearing sections 45 may still possess sufficient tensile and shear strength to keep valve 10 closed during normal operating conditions; for example, shearing sections 45 may have strength to withstand a normal operating pressure differential between inlet 11 and outlet 12. Shear cap 40 may be further retained by a ring 41 or other keeping device passing through shear cap 40 to retain the same while allowing some movement or rotation.

As shown in FIG. 1, an explosive cap 20 is paired with a moveable tension bolt 30 in a casing of valve 10. Tension bolt 30 may be moveable and configured to be separated and driven under an explosive force of explosive cap 20 but not under spurious vibrations or impacts. Explosive cap 20 may be an assembly including several initiators or squibs that are activated through a circuit 25 or other connector. Tension bolt 30 is positioned to vertically drive down onto a moveable shearing piston 31. Explosive cap 20 is positioned to explosively drive apart tension bolt 30 into shearing piston 31, forcing shearing piston 31 downward with extreme force. When unactuated, shearing piston 31 may be upwardly maintained by low-force springs or other holders.

FIG. 2 is a cross-sectional schematic of explosive safety valve 10 in an opened configuration. As seen in FIG. 2, exploded cap 20' has separated and driven tension bolt 30' into shearing piston 31. In turn, shearing piston 31 has vertically sheared off shearing sections 45 (FIG. 1), resulting in shearing cap 40' becoming disconnected from inlet 11. A pressure of fluid flowing from inlet 11 to now un-blocked outlet 12 pushed shearing cap '40 away from inlet 11, and retaining ring 41 may cause shearing cap 40' to rotate downward in such a situation. Shearing cap 40' may contact a sensor 35 in a casing of valve 10, which may signal to operators or automated systems that valve 10 has successfully opened. In this way, actuation of explosive cap 20', potentially by an electric safety signal from connector 25, has caused related art valve 10 to open and remain open. Co-owned "ESBWR Design Control Document, Tier 2," Revision 10 of April, 2014, Chapter 5, describes helpful technological context and is incorporated by reference herein in its entirety.

SUMMARY

Example embodiments include safety valves with reliable, discreet actuation modes and flexible designs to permit implementation in several different physical configurations. Example valves define a passageway to carry a fluid when the valve is opened. A barrier occludes the passageway in a closed configuration, preventing fluid from flowing through the closed valve. The barrier, however, is disruptable with a projectile that impacts the barrier when actuated. Upon impact, the barrier and/or the projectile can flow out of the passageway and valve, without blocking the same.

Several different projectiles are useable in example embodiments, including bullets, captured striking rods, shaped pellets, etc. Projectiles may use electromagnetic forces, pneumatics, explosives, etc. to impact the barrier. For example, a gunpowder-fired bullet is useable as a projectile that can be fired with several different types of firing pins, accelerating circuits, ignition circuits, etc. potentially in resilient or redundant combinations. Example embodiment valves can use a catching apparatus to retain the projectile, barrier, or pieces of the same in the fluid flow, preventing dispersion of potentially multiple fragments into the fluid flow from the valve. The catching mechanism may dislodge into the fluid flow as a single envelope of all pieces, and such dislodging may be detected by sensors to indicate valve opening.

Similarly, several different types of barriers can be paired with a projectile to ensure reliable and complete valve opening. For example, a shatterable glass plate, a flexible sheet with a breakable cap, a rotatable door with a breakable cap, etc. Such barriers can withstand several thousands of pounds of pressure, high temperatures, mechanical damage, radiation, etc. and remain blocking and thus closing the valve. Through an intentionally frangible portion or material, the barrier can break apart into the flow passageway, opening the same. The pieces can then independently flow out of the valve without blocking, while assuring valve opening. Circuits through barriers and other valve components can easily determine valve status given the disruption or destruction of various parts upon projectile firing and barrier removal.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the terms which they depict.

DETAILED DESCRIPTION

Figure 1:
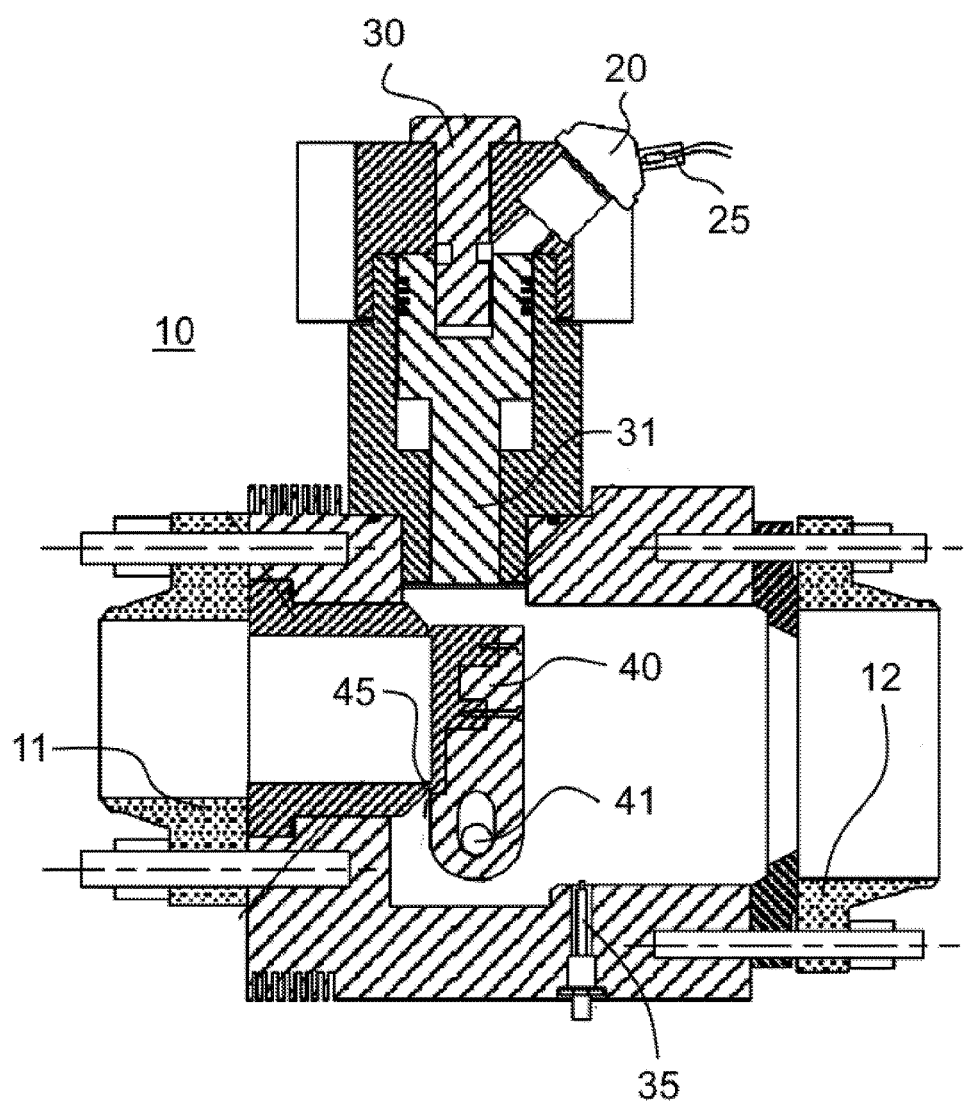
FIG. 1 is a cross-sectional schematic of a related art safety valve in an unfired position.

Because this is a patent document, general broad rules of construction should be applied when reading and understanding it. Everything described and shown in this document is an example of subject matter falling within the scope of the appended claims. Any specific structural and functional details disclosed herein are merely for purposes of describing how to make and use example embodiments or methods. Several different embodiments not specifically disclosed herein fall within the claim scope; as such, the claims may be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.). Similarly, a term such as "communicatively connected" includes all variations of information exchange routes between two devices, including intermediary devices, networks, etc., connected wirelessly or not.

As used herein, the singular forms "a", "an" and "the" are intended to include both the singular and plural forms, unless the language explicitly indicates otherwise with words like "only," "single," and/or "one." It will be further understood that the terms "comprises", "comprising,", "includes" and/or "including", when used herein, specify the presence of stated features, steps, operations, elements, ideas, and/or components, but do not themselves preclude the presence or addition of one or more other features, steps, operations, elements, components, ideas, and/or groups thereof.

It should also be noted that the structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from the single operations described below. It should be presumed that any embodiment having features and functionality described below, in any workable combination, falls within the scope of example embodiments.

The Inventors have newly recognized that existing safety valves are relatively large, with several moving parts among an explosive cap, tension bolt, and shear cap. It is difficult to adapt larger valves across several differently-sized injection points in different plant and engineering system designs without significantly varying functionality and matching different explosive caps to each different shearing cap size. The Inventors have further recognized that existing safety valves, with dividing tension bolts, several initiating squibs, and large explosive caps to drive the bolts, are likely to become damaged at initiation, potentially moving a shearing cap into the flow path to block the same or damaging actuation sensors. The Inventors have additionally recognized that reliable chemical components for explosive caps, providing a precise amount of energy for reliable actuation without degradation over time, are not readily known or easily acquired. Example embodiments described below address these and other problems recognized by the Inventors with unique solutions enabled by example embodiments.

The present invention is safety valves with highly-reliable, discreetly-disruptable flow barriers that control an open or closed status of the valve. In contrast to the present invention, the few example embodiments and example methods discussed below illustrate just a subset of the variety of different configurations that can be used as and/or in connection with the present invention.

Figure 2:
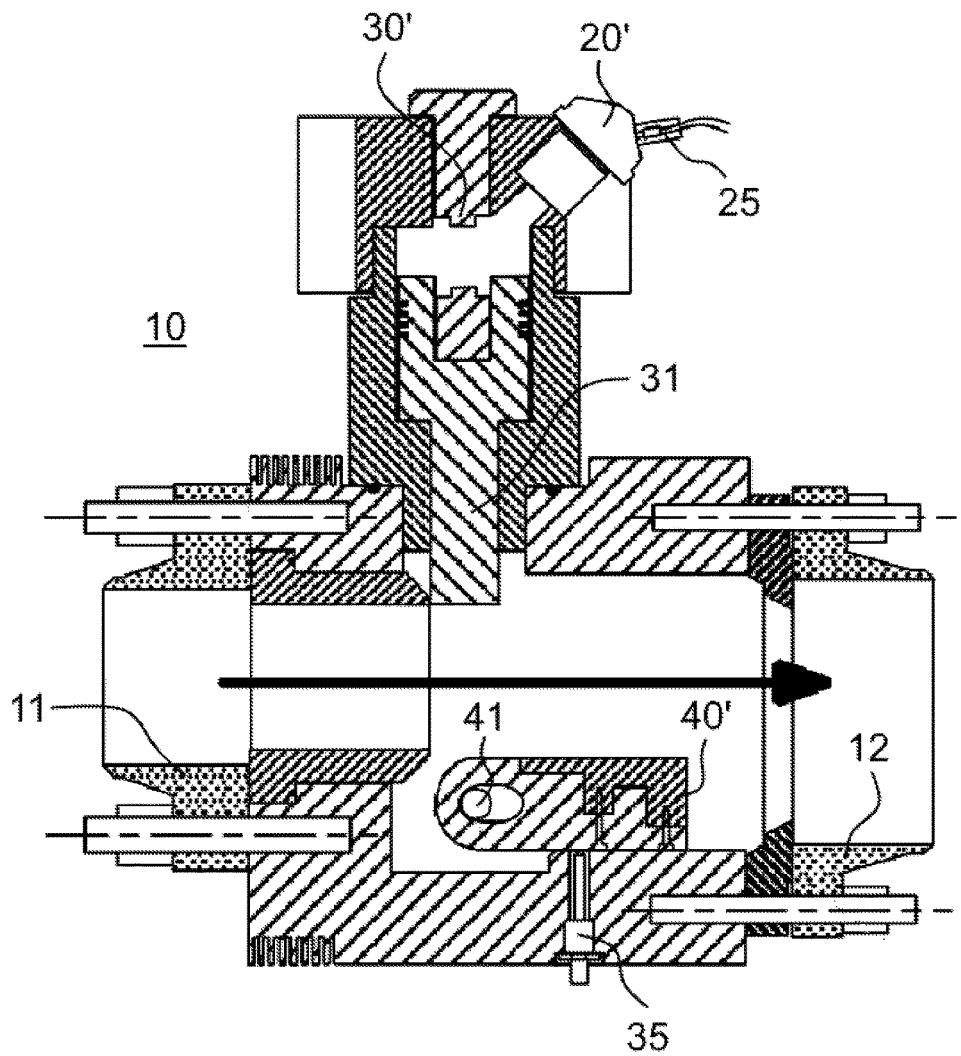
FIG. 2 is a cross-sectional schematic of the related art safety valve in a fired position.
Figure 3:
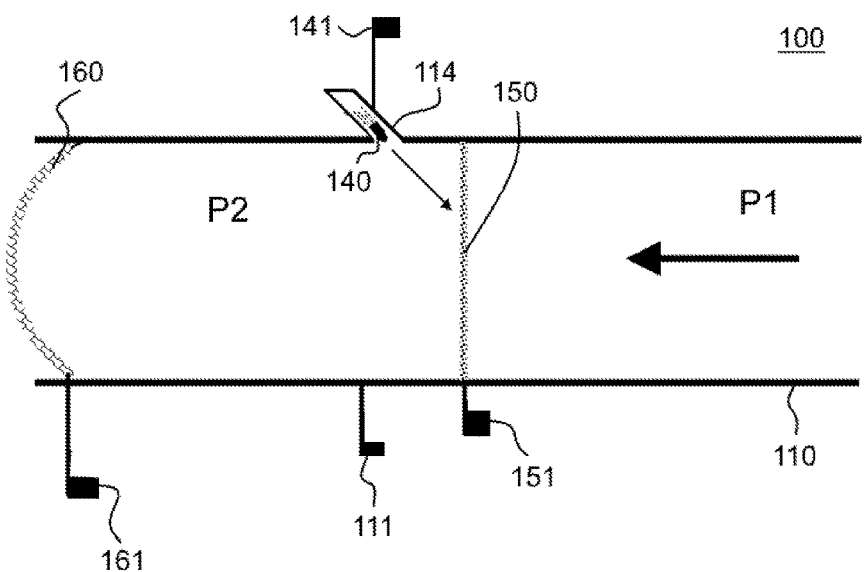
FIG. 3 is a cross-sectional schematic of an example embodiment projectile impact safety valve.

FIG. 3 is an illustration of an example embodiment projectile impact safety valve 100. Although not shown in FIG. 3, example safety valve 100 is useable between any flow areas or conduits, including between coolant injection sources and nuclear reactors, in place of or in combination with related art valves 10 (FIGS. 1-2). As seen in FIG. 3, a body or conduit 110 directs or carries fluid to a desired destination. Conduit 110 is blocked by barrier 150, which prevents such flow through conduit 110 while intact. Barrier 150 is largely impermeable to the fluid and configured to prevent fluid flow through conduit 110 at any range of pressure differentials across barrier 150. For example, P1 to the right of barrier 150 in FIG. 3 could be nearly equal or higher, such as several megapascals or over ten-thousand psi higher, than P2 on the left, and barrier 150 remains intact, preventing fluid flow through conduit 110. As a specific example in a nuclear reactor, P1 may be over 1100 psia in order to ensure injection into a reactor system operating at P2 under 1100 psia. Barrier 150 when intact prevents flows in conduit 110 under such conditions, even when subject to high temperatures, corrosive fluids, mechanical vibrations and shocks, and/or radiation encountered in an operating nuclear reactor environment.

Barrier 150 is disruptable only under impact from projectile 140, ensuring discreet and intentional failure of barrier 150 and commencement of flow through conduit 110. Projectile 140 may be a bullet, pellet, shell, striking rod, or other material that is capable of being forcefully projected at, and disabling, barrier 150. For example, projectile 140 may be a ballistic element made of solid, higher density material and propelled through ignition of gunpowder or other explosive about the projectile in chamber 114 off conduit 110, such as a .22 round. Or, for example, projectile 140 may be a metallic rod or pellet accelerated under electromagnetic or pneumatic forces from within chamber 114. Upon impact with barrier 150, projectile 140 ruptures or otherwise mechanically changes barrier 150 such that fluid will flow through conduit 110 without being blocked by barrier 150.

Projectile 140 may be positioned anywhere to ensure accurate and disruptive contact with barrier 150 when actuated. As shown in FIG. 3, projectile 140 may be positioned in chamber 114 directed at barrier 150 on what is expected to be an evacuated or lower-pressure side of barrier 150. In such an example, projectile 140 may extend through relatively empty and/or less dense space of conduit 110, more easily ensuring accurate impact with barrier 150. Or, for example, projectile 140 may be positioned in a central part of channel 110, in barrier 150, or on either side of barrier 150 where it can be accelerated under force to contact and disrupt barrier 150.

Because chamber 114 and projectile 140 may be placed in several different positions and in any number while still being able to strike barrier 150, example embodiment valve 100 may be more resistant to damage or failure, particularly in mechanical or thermal challenges likely encountered exactly when a safety valve must actuate. For example, redundant, top- and bottom located chambers 114 and projectiles 140 may ensure that any damage done to a top of valve 100, such as by a falling piece of equipment in a seismic event, does not affect functionality of example embodiment valve 100, which can still actuate with a bottom projectile 140.

Projectile 140 may be paired with an actuator 141 including a starter or other force-generating device as well as sensors to determine actuation of projectile 140 and thus opening of example embodiment safety valve 100 by disruption of barrier 150. For example, actuator 141 may include an electric circuit for propelling projectile 140. Such an electric circuit in actuator 141 may, for example, ignite an explosive like gunpowder, cause two reagents to be mixed in an explosive or expanding reaction, or create a magnetic field in a railgun or coilgun-type configuration, to propel projectile 140. With a sensor for receiving signals from a controller or safety system, upon receipt of an emergency or actuation signal, or loss of power in a fail-open configuration, actuator 141 may drive projectile 140 to impact barrier 150, opening conduit 110. Actuator 141 may further generate signals to confirm discharge, or non-discharge, of projectile 140 via connection to a control room or operator.

Example embodiment projectile impact safety valve 100 may further include a catcher 160 to retain and/or collect barrier 150 or remnants thereof. For example, catcher 160 may be a fine metal mesh that retains fragments of barrier 150 drawn downstream through conduit 110 following destruction of barrier 150. Or, for example, catcher 160 may be a balloon, magnet, or adhesive that envelops, traps, or joins to barrier 150 and pieces thereof as they flow downstream after being struck by projectile 140. Catcher 160 may itself then release into conduit 110 or at an exit of valve 100, containing all pieces together in the flow. Catcher 160 may always be present and static or may include an actuator 161 that releases catcher 160 coincident with actuation of projectile 140. Actuator 161 may further include a sensor for receiving signals to deploy catcher 160 and/or to report the presence or actuation of catcher 160.

As shown in FIG. 3, barrier 150 may be paired with a sensor 151, and it is also possible to include a flow sensor 111 along conduit 110. Barrier sensor 151 may confirm presence or intact status of barrier 150, and conduit sensor 111 may be a flowmeter to other flow detection device. In this way, sensors 151 and 111 may further confirm open or closed status of example embodiment valve 100 through detection of presence of barrier 150 or fluid flow through conduit 110. Signals from sensors 111 and/or 151 may be reported to a control room or valve operator, for example, indicating valve open or closed status, or, more specifically, barrier 150 status.

Barrier 150, projectile 140, projectile actuator 141, and catcher 160 may be embodied in several different ways in example embodiments. Without need for a heavy tension bolt and/or large explosive cap to achieve releasing sheer, and instead using a relatively smaller and/or more flexible projectile, example embodiment valve 100 may be sized and shaped with barrier 150 and projectile 140 in a variety of different locations and engineering situations and easily adapted for different space requirements. Regardless of exact implementation, projectile 140 and barrier 150 provide a highly-controllable and reliable structural pairing that controls flow through conduit 110. The examples below illustrate specific types of barriers 150, catcher 160, and/or projectile 140 with actuator 141, it being understood that these examples are interchangeable and nonexclusive.

Glass Barrier

Figure 4:
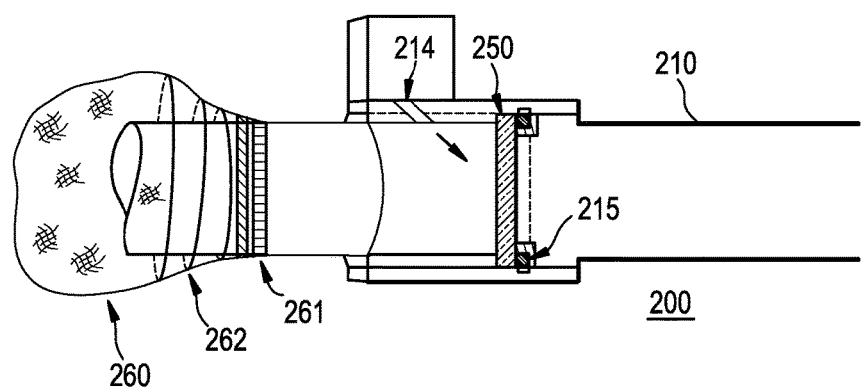
FIG. 4 is a cross-sectional schematic of another example embodiment projectile impact safety valve.

FIG. 4 is an illustration of an example embodiment projectile impact safety valve 200 using a vitreous barrier 250. For example, barrier 250 may be a high-strength glass or similar material of a thickness sufficient to withstand a static fluid pressure differential across barrier 250. For a circular channel 210 with an approximately 12-inch diameter, barrier 250 being cylindrical and approximately 2.5 inches thick may be sufficient to withstand a several-thousand psi pressure differential with a safety factor of 4 for most types of common silicate glass. Of course, other thicknesses and types of glass may be chosen based on varying conduit 210 sizing and shape as well as known pressure differentials and desired safety factors.

Glass barrier 250 will shatter, or significantly degrade in strength, however, under impact from a projectile. The projectile is of sufficient speed and mass to disrupt glass barrier 250, despite glass barrier 250 potentially withstanding large pressure differentials in conduit 210 with a safety factor of 3 or higher. A projectile may create over ten thousand pounds of pressure locally about an impact point, uniquely cracking and/or shattering otherwise strong glass, causing failure of barrier 250. For example, a bullet such as a .22 long rifle round fully impacting a relatively inelastic 2.5-inch glass barrier 250 at around 1600 feet per second will cause failure by shattering—even in glass barrier 250 holding back a large (thousands of psi) pressure differential across barrier 250 due to fluid pressure. Or for example, using a stronger or less shatterable glass, like a borosilicate or laminated glass of 1.2 inch thickness, the projectile may still significantly crack and weaken glass barrier 250 upon impact, such that a large fluid pressure differential will then be sufficient to break up barrier 250.

In the example of FIG. 4, glass barrier 250 is rigidly held in place in conduit 210 by gasketted retainers 215. For example, retainers 215 may be a stainless steel lip, rim, or edge extending around glass barrier 250 with a rubber or other elastic gasket intervening to prevent leakage. If retainers 215 and/or conduit 210 is narrower on a higher-pressure side of barrier 250, such that barrier has less surface area exposed to a higher pressure fluid, a higher safety factor may be achieved, while still providing a large surface area for a projectile to impact and cause failure in glass barrier 250. A projectile may be positioned or aimed toward such a larger face of glass barrier 250, as seen in FIG. 4, where a chamber 214 may house a projectile and associated actuator.

Mesh Catcher

Example embodiment safety valve 200 may further include a mesh catcher 260 fitted about an end of conduit 210. Or mesh catcher 260 may be fitted much farther downstream, such as at an end of a pipe which valve 200 controls. Mesh catcher 260 may be a fine metallic mesh structure surrounding an exit of conduit 210, such as a 0.5 mm hole-size stainless steel mesh. Mesh catcher 260 may also be a non-metallic material, containing a metallic or wiring liner to conduct electricity. Mesh catcher 260 may allow fluid, such as fluid in the space being injected into, to pass with minimal interference, but mesh catcher 260 may retain shards or pieces of glass barrier 250 following destruction of the same by a projectile to open valve 200. Catcher 260 may further retain a bullet or pellet projectile used to rupture barrier 250. In this way, pieces of glass barrier 250, other barrier pieces, and/or a bullet or pellet may not enter the system being injected into or interfere with other components in the system.

Mesh catcher 260 may include an elastic band 262 wound about an end of catcher 260 to keep an end of catcher 260 closed. Particular in the instance that catcher 260 dislodges from conduit 210 or another injection site pipe, elastic band 262 may seal an end of catcher 260, keeping all glass pieces from barrier 250 as destroyed therein. Elastic band 262 may be of a strength so as to reliably secure mesh catch 260 until desired activation of safety valve 200, such that catcher 260 is removed only with opening of valve 200 and only after catching solid debris from such opening.

Mesh catcher 260 may further be attached to a sensor 261, such as copper or other conductive wiring, that indicates presence of catcher 260 or status of valve 200 through electrical signals. For example, sensor 261 may maintain a low-level current through a metallic mesh catcher 260, indicating that mesh catcher 260 is present and thus valve 200 is not open or discharging. Upon rupture of barrier 250 and removal of mesh catcher 260 due to fluid injection and receipt of barrier fragments, the low-level current may be broken. In this way, an operator may determine that example embodiment valve 200 is open and carrying fluid because mesh catcher 260 has been removed by such opening. An operator may also determine if mesh catcher 260 has detached spuriously or failed due to a lack of the low-level current detected by sensor 261. In this way, an operator may thus know whether valve 200 has malfunctioned and whether to look for catcher 260 detached from the same.

Ductile Barrier

Figure 5:
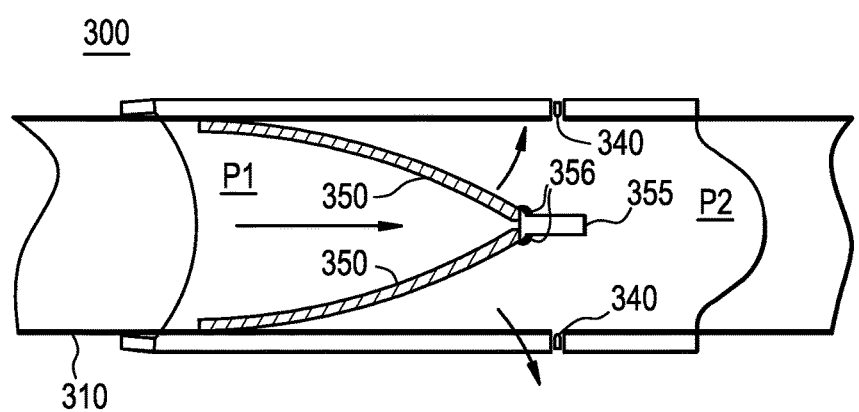
FIG. 5 is a cross-sectional schematic of another example embodiment projectile impact safety valve.

FIG. 5 is an illustration of an example embodiment projectile impact safety valve 300 using a flexible metallic barrier 350. As seen in FIG. 3, barrier 350 may include two or more leafs or segments forming a complete or partial conical barrier 350. The segments may be flexible, such as a ductile metal like thinly-milled stainless steel sheets. The segments are joined by a cap 355 that holds the segments together at an end of the conical shape, thus forming barrier 350. Cap 355 can be any structure that will hold conical barrier 350 together. For example, cap 355 may be a carbon steel bar or prismatic tip joined to barrier 350. In the instance that both cap 355 and barrier 350 are metallic, cap 355 and barrier 350 may be joined by welds 356 that easily shear but are otherwise very stress resistant.

One or more projectiles 340 are positioned about cap 355 and configured to impact the same upon actuation. For example, projectile 340 may be a pneumatic piston or bullet aimed at cap 355 from edges of conduit 310. Upon actuation projectiles 340 impact and destroy or separate cap 355 from barrier 350. For example, if cap 355 is a carbon steel cap welded to stainless steel conical barrier 350, projectile 340 may strike cap 355 with sufficient force to break or shear off welds 356. Cap 355 may be sufficiently long such that several projectiles 340 can be positioned or aimed at different length areas from different angular positions about cap 355. Such redundant and varied placing of projectiles 340, while still permitting impact and disruption of barrier 350 in example embodiment valve 350, may improve robustness and reduce likelihood of failure in the event any one projectile becomes damaged or disabled.

When cap 355 is removed, barrier 350 is sufficiently disrupted such that fluid can flow through barrier 350 in the direction shown in FIG. 5. Leafs or segments of barrier 350 are sufficiently flexible or ductile that, upon being unjoined from cap 355 and exposed to fluid flow through the space left by cap 355, barrier 350 will bend or "peel" back toward interior edges of conduit 310 under a pressure differential, where P1 is greater than P2. Once bent or moved toward conduit 310, barrier 350 will remain relocated, opening example embodiment valve 300. However, while cap 355 is in place, barrier 350 has sufficient strength to remain unbent and fully resist pressure differential between P2 and P1, potentially to several safety factors. For example, barrier 350 may be fabricated out of two thin stainless steel segments that join to cap 355 by welds 356, which may present sufficient strength while intact not to deform.

Barrier 350 in example embodiment valve 300 may be sized and positioned based on expected pressure differential and sizing of conduit 310. Similarly, projectiles 340 may be of any number and in any position to ensure removal of cap 355 upon actuation, achieving reliable disruption and failure of barrier 350 only upon impact. Sensors and catching structures, although not shown, may equally be used with example embodiment valve 300. For example, an electromagnet catcher may be installed downstream in conduit 310 to attach and retain any bullet and cap 355 made of ferrous materials.

Hinged Barrier

Figure 6:
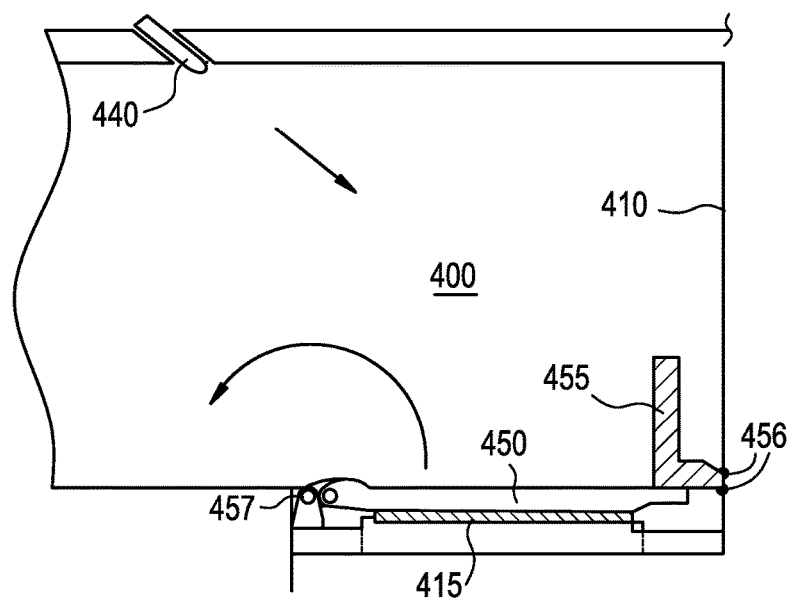
FIG. 6 is a cross-sectional schematic of another example embodiment projectile impact safety valve.

FIG. 6 is an illustration of an example embodiment projectile impact safety valve 400 using a hinged door barrier 450. As seen in FIG. 3, door barrier 450 may be attached to a conduit 410 in valve 400 via a hinge 457. When closed, door barrier 450 may seat against a gasket 415 and be held in place by cap 455 secured to an inner surface of conduit 410. For example, cap 455 and conduit 410 may be metallic, and welds 456 may join the two.

Similar to other embodiments, projectile 440 may be positioned to impact cap 455 on barrier 450. For instance, projectile 440 may be a bullet that strikes about an arm of cap 455, breaking welds 456. Projectile 440 may impact welds 456 with greater force through a larger torque arm provided by a shape of cap 455. The greater force of projectile 440 and better leverage offered by cap 455 may be sufficient to reliably break welds 456, whereas any pressure gradient on either side of barrier 450 may be of insufficient force and/or leverage to break welds 456 by a safety factor of three or more.

Once welds 456 are broken by projectile 440 having struck cap 455, door barrier 450 may swing open about hinge 457 under force from a fluid behind door 450. Cap 455 may remain attached to door barrier 450, breaking only about welds 456 to conduit 410. In this way, fewer fragments or shards may be created by the removal of barrier 450 in example embodiment safety valve 400.

Electronic Actuation Systems

Figure 7:
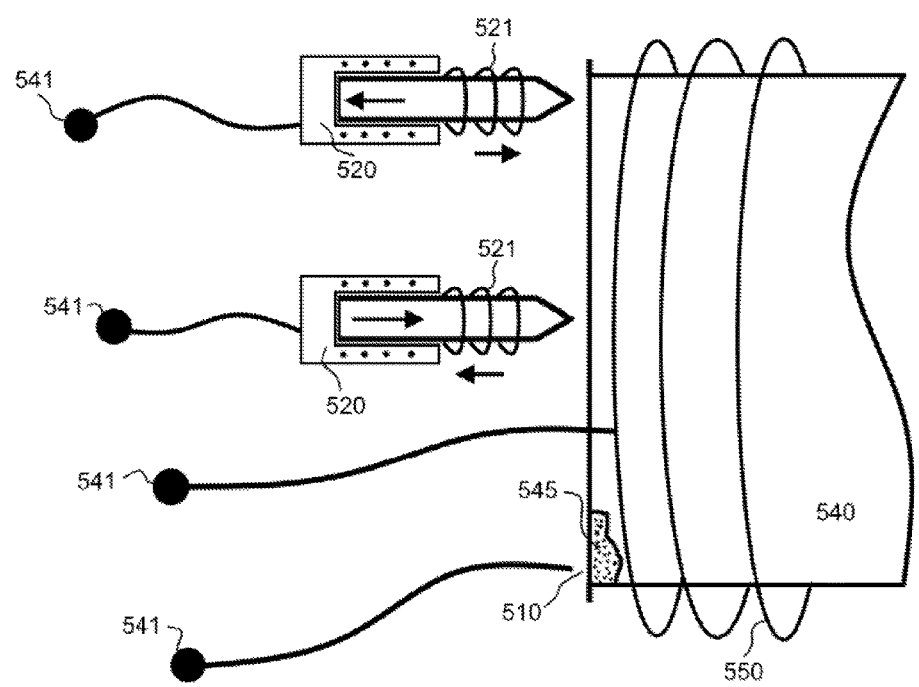
FIG. 7 is a profile view of a projectile and actuator system useable with example embodiments.

FIG. 7 is an illustration of an example embodiment projectile 540 and actuator(s) 541. An electric circuit from actuator 541 drives projectile 540 toward a barrier, such as disruptable barrier 150 (FIG. 3) to open a safety valve. In FIG. 7, a bullet 540 is used as a projectile. For example, bullet 540 may be a rimfire-style .22 (long or short) round bullet. Bullet 540 includes gunpowder 545 or a similar variant explosive in a lower portion that fires and drives bullet 540. Such explosives may be ignited through striking a rim portion of bullet 540, through electrical current, or through thermal ignition. A .22 caliber round with gunpowder may be particularly advantageous in a nuclear reactor environment, because .22 caliber ballistics are well-developed and known to be reliable, and high-quality .22 rounds are available from several providers. Moreover, gunpowder is a reliable explosive that remains potent over long periods of time and is fairly resistant to radioactive activation and deterioration.

As shown in FIG. 7, bullet 540 can be driven by multiple actuators 541 using several different ignition or propellant systems. For example, up to four different contact or ignition points 510 may be spaced about the lower rim of bullet 540. Although not visible given the side profile of FIG. 7, each actuator 541 and associated ignition or propelling structure may be spaced angularly at 90-degree intervals or more. In this way, bullet 540 can be propelled through several different systems, providing redundancy and diversity in projectile mode and avoiding the potential for any single failure to prevent firing. Although several different projectile methods are shown in use with bullet 540, it is understood that only one, or a different combination, as well as other non-illustrated, modes of firing a projectile are useable in example embodiments.

For example, in FIG. 7, a bare wire or other circuit may connect to a contact point 510 about a base of bullet 540. When actuator 541 provides a current or signal, a circuit may be completed through a casing of bullet 540, igniting gunpowder 545 and discharging bullet 540. Or, for example, an induction-type coil 550 may be wrapped above bottom rim of bullet 540. When actuator 541 passes a current though coil 550, gunpowder 545 may be thermally ignited by the resulting induction. Moreover, if bullet 540 is ferromagnetic, a magnetic field generated by current in coil 550 may further propel bullet 540 (or any ferromagnetic projectile) in a similar manner.

As further examples, solenoid-driven contact pin 520 may be used to fire bullet 540 by striking a bottom rim of bullet 540 with a firing pin. Contact pins 520 may provide additional options of fail-safe and fail-as-is implementations. For example, a spring 521 may drive firing pin 520 either toward or away from bullet 540 and must be opposed by a solenoid activated by actuator 541 in order to move firing pin 520. This can be used to achieve a fail-as-is effect as shown in lower solenoid-driven firing pin 520 in FIG. 7, where spring 521 urges pin away from bullet 540. In order to achieve firing of lower pin 520, actuator 541 must provide a current or signal to activate the solenoid and counter spring 521, such that lower pin 520 will cause ignition through contact only when a signal or firing current is received, but not in a loss-of-power or other failure scenario, where spring 521 will keep the lower pin 520 from firing bullet 540.

Or this can be used to achieve a fail-safe effect as shown in upper solenoid-driven firing pin 520 in FIG. 7, where spring 521 urges pin toward bullet 540. To prevent contact and thus firing by upper pin 520, actuator 541 must continuously provide a current or signal to activate the solenoid and counter spring 521, pulling upper pin 520 away from bullet 540. Upper pin 520 will cause ignition through contact whenever that signal or firing current is lost, such as in a loss-of-power or other failure scenario, because spring 521 will drive the upper pin 520 to contact the lower rim and fire bullet 540. In this way, example embodiment safety valves may be ensured to open in loss of power or other failure scenarios, which may be desirable if a particular safety system for such loss-of-power transients requires an open valve.

Each actuator 541 may be individually connected to an operator or control room for example for individual use and actuation. Similarly, all actuators 541 may be on a combined circuit and thus configured to fire simultaneously without individual use. Actuators 541 may receive and condition signals from operators to properly initiate and fire bullet 540 by generating appropriate amounts of current. Similarly actuators 541 may be connected to safety systems, such as nuclear plant automated safety systems, and receive ignition signals from such systems in order to automatically and reliably open valves necessary for such safety systems. Further, actuators 541 may include sensors or generate signals that indicate a status of bullet 540 and/or a valce containing the same. For example, actuators 541 connected to an induction coil 550 may be able to determine presence or absence of bullet 540 through resistance in coil 550 and report the same to an operator or as a valve status. Similarly, actuators 541 controlling solenoid-driven ignition pins 520 may detect a firing or pin status based on electrical properties and report the same.

Although actuators have been described in connection with a conventional .22 round bullet using gunpowder as a propellant, it is understood that other projectiles and driving forces can be used in combination with example embodiments, including magnetic- or induction-based coilgun or railgun configurations, use of other chemically expanding propellants, pneumatic propulsion, etc. Because example actuators and projectiles may be reconfigured in a number of different ways, example embodiment valves are useable with a wide variety of systems regardless of shape, size, failure risks, etc.

Example embodiments and methods thus being described, it will be appreciated by one skilled in the art that example embodiments may be varied and substituted through routine experimentation while still falling within the scope of the following claims. For example, a variety of different physical valve configurations have been shown with different physical barriers that are removed for valve operation; however, other types of barriers are compatible with example embodiments and methods simply through proper dimensioning and placement in connection with a projectile—and fall within the scope of the claims. Such variations are not to be regarded as departure from the scope of these claims.

What is claimed is:

1. A high-reliability safety valve, comprising:
   a conduit for a fluid;
   a barrier in the conduit completely preventing flow of the fluid through the conduit;
   a ballistic projectile targeting the barrier, wherein the projectile is independent of the conduit such that the projectile flows out of the conduit in the flow of the fluid after impacting and breaking the barrier;
   a catcher paired with the conduit, wherein the catcher is permeable to the flow of the fluid and impermeable to the projectile and the barrier; and
   a catcher sensor completing an electrical current through the catcher, wherein the catcher conducts electricity, and wherein the sensor is configured to generate a valve opening indication upon loss of the electrical current.

2. The valve of claim 1, wherein the ballistic projectile is a bullet propelled by gunpowder.

3. The valve of claim 1, wherein the catcher is a metallic mesh envelope with an elastic opening, and wherein the catcher is configured to enter the flow of the fluid after enveloping at least one of the projectile and at least a portion of the broken barrier.

4. The valve of claim 1, wherein the barrier is a glass plate extending throughout a cross-sectional flow area of the conduit, and wherein the glass plate is configured to shatter upon impact from the projectile.

5. The valve of claim 1, wherein the barrier is a flexible cone topped by a cap, and wherein the projectile is targeted at the cap, and wherein the flexible cone is configured to flex toward an inner surface of the conduit in the flow of the fluid after the cap is broken off.

6. The valve of claim 5, wherein the flexible cone includes a thin sheet of stainless steel incompletely extending through a flow area of the conduit, and wherein the cap is a carbon steel rod welded to the stainless steel sheet.

7. The valve of claim 1, wherein the barrier is a hinged door rotatable and joined to the conduit, and wherein the hinged door includes a cap rigidly joined to the conduit so as to prevent the rotation.

8. The valve of claim 1, wherein the ballistic projectile is a .22 caliber bullet, the valve further comprising:
an actuator configured to strike the bullet at four points about a rim of the bullet, wherein the four points are separated by at least 90 degrees about the rim.

9. A high-reliability safety valve, comprising:
a conduit for a fluid;
a barrier in the conduit completely preventing flow of the fluid through the conduit, wherein the barrier is configured to break into multiple pieces smaller than the conduit, and wherein at least one of the pieces is configured to freely flow in the fluid so as to exit the conduit and the valve without blocking the conduit;
a projectile configured to impact and break the barrier into the multiple pieces, wherein the projectile is on an opposite side of the barrier from the fluid when the barrier is intact; and
a plurality of actuators for the projectile, wherein at least one of the actuators is configured to fire the projectile at the barrier with an electrical current, and wherein at least one of the actuators is configured to fire the projectile at the barrier upon loss of the electrical current.

10. The valve of claim 9, further comprising:
a catcher paired with the conduit and configured to retain the multiple pieces.

11. The valve of claim 10, wherein the catcher is a metallic mesh envelope with an elastic opening, and wherein the catcher is configured to detach and freely flow in the fluid after enveloping the multiple pieces.

12. The valve of claim 11, further comprising:
a catcher sensor completing an electrical current through the catcher, wherein the catcher conducts electricity, and wherein the sensor is configured to generate a valve opening indication upon loss of the electrical current.

13. The valve of claim 9, wherein the barrier is a frangible material configured to withstand at least 10,000 psi static pressure differential and break upon impact from the projectile.

14. The valve of claim 13, wherein the barrier is at least one of glass and a metal.

15. The valve of claim 14, wherein the barrier is a glass plate, the valve further comprising:
a rim in the conduit retaining the glass plate in the conduit; and
a gasket between the rim and glass plate.

16. A method of operating a safety valve, the method comprising:
firing a projectile at a barrier preventing fluid flow in the valve, wherein the projectile disrupts the barrier to cause the fluid to flow through the valve, wherein the firing is executed with a plurality of actuators each independently controlled to fire the projectile at the barrier ; and
collecting the projectile with a catcher in the fluid flow at an exit of the valve.

17. The method of claim 16, further comprising:
collecting pieces of the barrier in the catcher; and
releasing the catcher in the fluid flow after the collecting the projectile and the pieces.

* * * * *